United States Patent
Douglas et al.

(10) Patent No.: US 6,499,353 B1
(45) Date of Patent: Dec. 31, 2002

(54) METHOD AND APPARATUS FOR REMOTE MEASUREMENT OF PHYSICAL PROPERTIES INSIDE A SEALED CONTAINER

(75) Inventors: Dennis G. Douglas, Bend, OR (US); Phillip C. Ohl, Keppenick, WA (US); Alan A. Burns, Portola Valley, CA (US)

(73) Assignee: Vista Research, Inc., Sunnyvale, CA (US)

(*) Notice: Subject to any disclaimer, the term of this patent is extended or adjusted under 35 U.S.C. 154(b) by 0 days.

(21) Appl. No.: 09/692,511

(22) Filed: Oct. 18, 2000

Related U.S. Application Data
(60) Provisional application No. 60/160,493, filed on Oct. 20, 1999.

(51) Int. Cl.[7] .............................. G01L 9/10; G01L 9/14
(52) U.S. Cl. ....................................................... 73/722
(58) Field of Search ........................... 73/722, 728, 756, 73/732–743, 753, 426, 427, 305–314; 324/208, 34 D, 34 R

(56) References Cited

U.S. PATENT DOCUMENTS

| | | | |
|---|---|---|---|
| 2,050,629 A | 8/1936 | Quereau et al. | 177/351 |
| 2,935,875 A | 5/1960 | Eggers et al. | 73/389 |
| 3,338,101 A | 8/1967 | Krasnitz et al. | 73/411 |
| 3,645,140 A | 2/1972 | Phillips et al. | 73/407 R |
| 3,777,565 A | 12/1973 | Munier et al. | 73/258 |
| 3,789,668 A | 2/1974 | Bissell | 73/418 |
| 3,807,232 A | 4/1974 | Wetterhorn | 73/418 |
| 3,857,219 A | 12/1974 | Bissell | 53/37 |
| 3,949,606 A | 4/1976 | Blanchett | 73/229 |
| 3,989,911 A | 11/1976 | Perry | 200/83 L |
| 3,998,179 A | 12/1976 | Dieterich et al. | 116/129 D |
| 4,023,410 A | 5/1977 | Althaus | 73/229 |
| 4,122,392 A * | 10/1978 | Takeuchi et al. | 324/208 |
| 4,339,955 A | 7/1982 | Iwasaki | 73/728 |
| 4,717,873 A | 1/1988 | Carr, Jr. et al. | 324/207 |
| 4,891,987 A | 1/1990 | Stockton et al. | 73/732 |
| 4,998,863 A | 3/1991 | Klaus | 417/63 |
| 5,081,876 A | 1/1992 | Marshall | 74/89.21 |
| 5,150,115 A | 9/1992 | Dejong et al. | 340/870.31 |
| 5,284,061 A * | 2/1994 | Seeley et al. | 73/746 |
| 5,392,653 A | 2/1995 | Zanger et al. | 73/756 |
| 5,433,115 A | 7/1995 | Spillman, Jr. et al. | 73/773 |
| 6,067,855 A * | 5/2000 | Brown et al. | 73/308 |
| 6,182,514 B1 | 2/2001 | Hodges | 73/722 |

* cited by examiner

Primary Examiner—William Oen
(74) Attorney, Agent, or Firm—David Jaffer; Pillsbury Winthrop LLP

(57) ABSTRACT

A method and an apparatus for measuring the pressure or other physical quantities of a gas or a liquid in a sealed container without penetrating the container. Two permanent magnets, one located on a sensing unit inside the container and one located on a readout unit located outside the container are used to communicate the magnitude of the pressure sensed inside the container to the readout unit. No power supply is required to implement this system.

27 Claims, 8 Drawing Sheets

METHOD AND APPARATUS FOR REMOTE MEASUREMENT OF PHYSICAL PROPERTIES INSIDE A SEALED CONTAINER

This application claims the benefit of provisional application No. 60/160,493, filed Oct. 20, 1999.

BACKGROUND OF THE INVENTION

1. Field of the Invention

The present invention relates generally to methods and apparatus for remotely measuring physical properties inside a sealed container without penetrating the walls of the container, and more particularly to a method for measuring the pressure, temperature, or other physical properties inside a non-magnetic, stainless steel storage container storing nuclear fuel and/or other hazardous products that can be implemented without requiring a power supply inside or outside of the container.

2. Description of the Prior Art

There are a variety of applications where the physical properties (such as pressure or temperature) of a substance, which may be either a gas or a liquid, inside a sealed storage container needs to be monitored or measured without any penetration of the external walls of the container and without any internal power supply. The storage of spent nuclear fuel or radioactive mixed waste is one such application. For safety reasons, the pressure inside such a container needs to be monitored to determine whether or not the container is likely to deform or rupture. Another application is the measurement of pressure or temperature inside a pressure vessel or pipe where electrical sensors cannot or are not easily or safely implemented or used.

There are a variety of different types and sizes of storage containers used by the United States Department of Energy (DOE) that need to be monitored for pressure. Conventional sensing systems that penetrate or tap into and through the walls of the container and affix a sensor to the inside of the container are avoided, because any penetration of the sealed container is a potential release site for the gas or liquid present in the container. These DOE storage containers are typically cylindrical in shape and are made of stainless steel. They can range from several inches in diameter and several feet in height to several feet in diameter and tens of feet in height.

It is important to determine whether or not any excessive buildup of pressure occurs in large, cylindrical, stainless-steel storage containers used to store spent nuclear fuel rods. Such containers at DOE's Hanford Site are approximately 2 ft in diameter and 14 ft in height. A cold vacuum drying process is used to remove water from the container so that it can be sealed and welded closed prior to being taken to a dry-storage vault for a 40-year storage period. While the cold-drying process is very effective, traces of water may remain. Over time, radiolysis can decompose the traces of water into its component elements (i.e., hydrogen and oxygen). In addition, hydroxyl-containing materials will similarly decompose, contributing to the hydrogen-oxygen atmosphere forming in the sealed container. It is possible that the hydrogen-oxygen atmosphere could eventually reach concentrations where the pressure inside the container could deform or rupture the container.

The most direct method for determining if there is a pressure build-up inside a container is to visually inspect the container for physical deformation. The obvious problem with this approach is that the level of the pressure is unknown and may have already exceeded the safe limits of the container by the time the deformation is visually detectable.

In other applications, magnetic coupling systems have been used, including a sensor apparatus and a reading apparatus separated from each other by a non-metallic wall. Two examples are fluid flow meters and smart sensors for structures. However, none of these systems have been used for interrogating the inside of a sealed container, especially one containing nuclear waste materials, and none have been used where the distance between the sensing and readout elements is very large (e.g., many inches). U.S. Pat. No. 3,949,606 describes counting the rotations of a flow meter using permanent magnets mounted on rotational elements on both sides of a non-magnetic wall. Various configurations and strengths of magnets have been used to accurately count the number of rotations of a flow chamber. More recently, a variety of smart sensors have been disclosed for sensing the characteristics of a structure with strain and other such gauges (e.g., U.S. Pat. No. 5,433,115). These smart sensors include a sensing element and a magnetic coil embedded directly into the structure and an exciter magnetic coil and readout unit mounted on the outside of the structure that can interrogate the sensing elements through a gap made of a non-magnetic material.

In U.S. Pat. No. 5,150,115, an inductive-type rotary encoder is described that has a stator with a conductive pattern on one side and a rotor with a conductive pattern facing the stator, and apparatus for inductively coupling and reading the angular position of the stator relative to the rotor.

In U.S. Pat. No. 4,339,955, a method is described for measuring the displacement of a diaphragm inside a pressure gauge by reading the movement of a permanent magnet mounted on the displacement element with an inductive coil across a very small air gap. This invention avoids physical contact of the displacement element with the reading element.

In view of the prior art described above, it is apparent that there is a need for an apparatus that can measure physical properties inside a sealed container without penetrating the walls of the sealed container.

SUMMARY

It is therefore an object of the present invention to provide a method and apparatus for measuring physical properties inside a sealed container.

It is another object of the present invention to provide a method and apparatus for measuring physical properties inside a sealed container that does not require penetrating the container walls.

It is a still further object of the present invention to provide a method and apparatus for measuring physical properties inside a sealed container that does not require internal electrical power.

It is another object of the present invention to provide a method and apparatus for measuring liquid or gas pressure inside a sealed container using permanent magnets and not requiring internal electrical power.

It is an object of the present invention to provide a method and apparatus for measuring physical properties inside a sealed container that uses internal and/or external power.

Briefly, a preferred embodiment of the present invention includes a method and apparatus for measuring gas pressure inside a sealed magnetic container. A transducer inside the container is responsive to pressure, having a Bourdon tube connected to a first pivotally mounted permanent magnet. The Bourdon tube has an oval cross section and a tube axis following a curved contour. A proximal end of the tube is open to the container atmosphere, and a closed distal end of the tube is coupled to the first magnet by means of a geared mechanism. As the pressure in the tube increases, the curved contour tends to straighten, causing the first magnet to rotate. A second permanent magnet is pivotally mounted and positioned exterior to the container, with the first and second magnets having a common pivot axis. The second magnet is rigidly attached to a pointer for indicating a pressure value indicated on a calibrated scale.

An advantage of the present invention is that it provides a safe method of measuring pressure in a nuclear waste container.

Another advantage of the present invention is that it provides a safe method of measuring a physical property inside a sealed container without penetrating the walls of the container.

A further advantage of the present invention is that it provides a method of measuring pressure in a sealed container without requiring electrical power.

IN THE DRAWING

DETAILED DESCRIPTION OF THE PREFERRED EMBODIMENT

Figure 1:
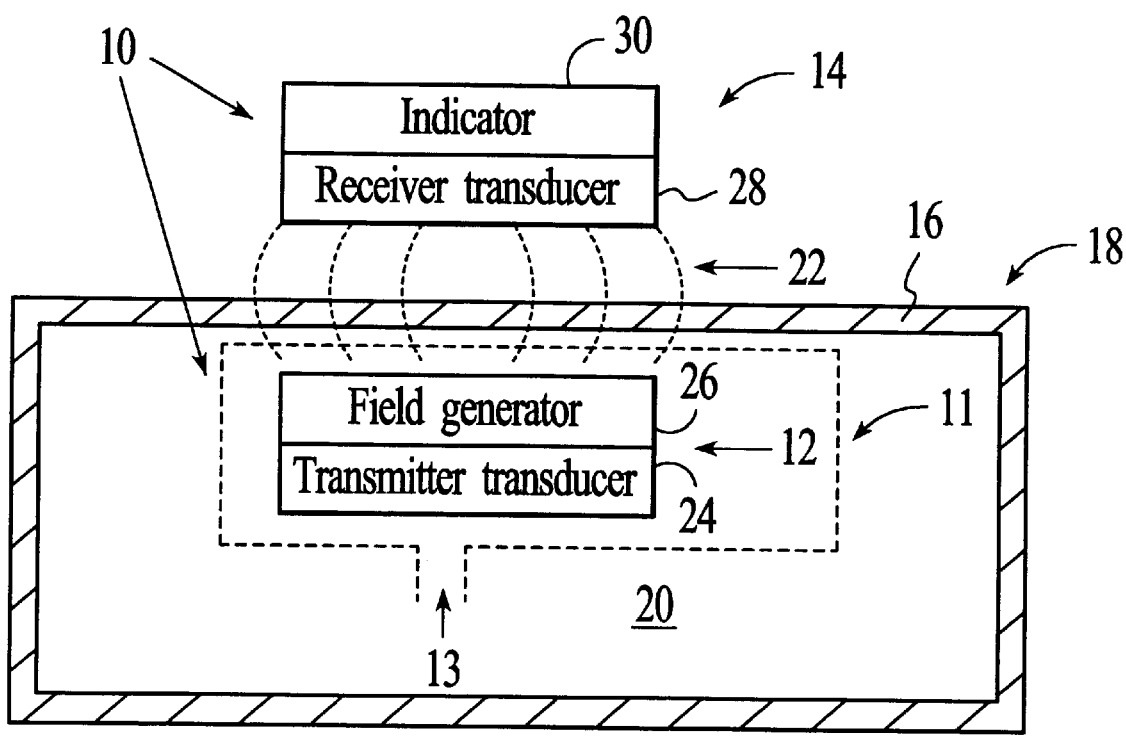
FIG. 1 is a block illustration of the preferred embodiment of the present invention.

A preferred embodiment of the method and apparatus of the present invention is illustrated in reference to FIG. 1 of the drawing. According to the present invention, an apparatus 10 is provided for determining a physical property of an environment inside a sealed container 18. The apparatus 10 includes a transmitter apparatus 12 separated from a receiver apparatus 14 by a wall 16 of the container 18. The container 18 wall 16 is preferably constructed of non-magnetic or weakly magnetic material, such as metal, plastic, or composite material, and the container is preferably used for storage of nuclear waste material. Of the various metals, the preferred material for the wall 16 is non-magnetic or weakly magnetic stainless steel, used in containers for storage of nuclear products. Other non-magnetic or weakly magnetic metals, plastics, and composite materials are also included in the spirit of the present invention. In addition, magnetic metals are also included in the spirit of the present invention.

The transmitter apparatus 12 is self contained, and does not require any physical connections/holes through the wall 16 for supply, etc. The transmitter 12 is constructed to respond to a value of a physical property of the inside 20 of the container 18 by causing a characteristic of a magnetic field 22 such as orientation to give an indication of the value of the physical property. The physical property, for example, can be the pressure of a gas or liquid inside the container 18, or it could be the temperature inside the container. The transmitter 12 includes a transmitter transducer 24 responsive to the value of the physical property to cause a magnetic field generator 26 to provide the magnetic field 22 with a characteristic indicative of the value (for example a magnetic field orientation). When pressure is measured, the transducer 24 includes an aneroid reference, symbolically represented by line 11 that has communication 13 with the fluid/gas inside the sealed container. The term "radiate" may be used in the following text and claims as a general term referring to the existence or creation of a magnetic field, even though in the case of a permanent magnet the field is not usually moving outward, but is static and therefore does not require an energy supply to sustain energy radiated from the magnet. The receiver 14 includes a receiver transducer 28 responsive to the field 22 to cause an indicator 30 to provide a communicative indication of the value of the physical property (temperature, pressure, etc.). The communicative indication can be any of various types, including display apparatus such as a needle and scale, or a digital read-out using LEDs, etc. The term "magnetic field generator" applies to any of the devices known by those skilled in the art for providing a magnetic field, and is preferably achieved using permanent magnets. The term "characteristic" applies to any property of a magnetic field that can be altered by a transducer, such as the Bourdon tube described in the following text, to give an indication of the value of the physical property. The term "physical property" applies to any measurable parameter inside the container, including the pressure or temperature of the substance inside the container. A particular and important embodiment of the present invention is the application of the disclosed apparatus to monitor physical properties inside a container used for storage of radioactive material, including nuclear waste. Due to the extreme hazard of leakage, the present invention is particularly useful in protecting the health and welfare of populations.

Figure 2:
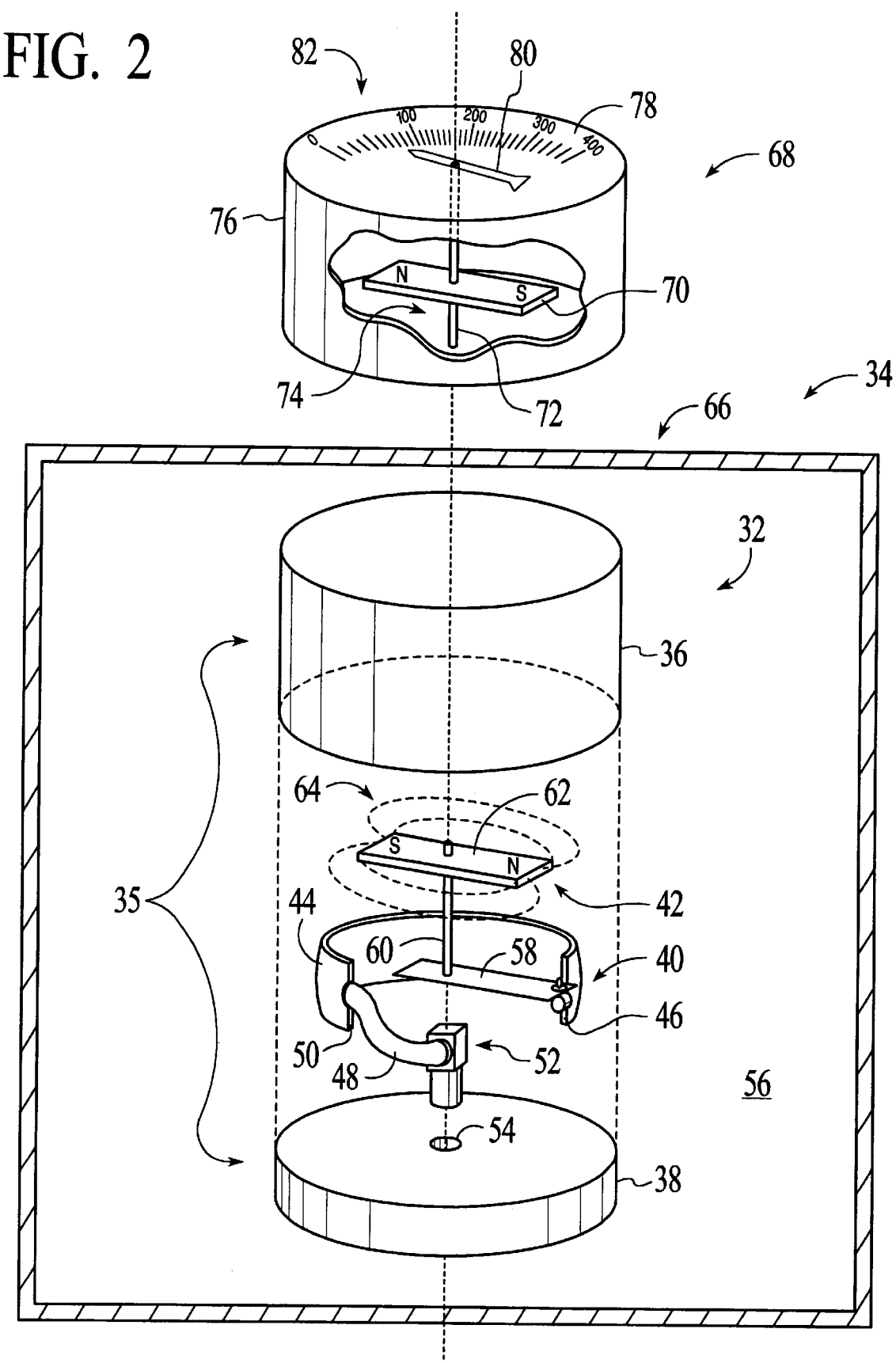
FIG. 2 is a simplified illustration of an embodiment of the present invention for measuring pressure inside a sealed container.

FIG. 2 of the drawing is a simplified illustration of an embodiment of the present invention for measuring the pressure inside a container. A transmitter 32 inside a container 34 is shown in an exploded view, and includes a sealed housing 35 having a cap 36 and base 38 that in assembly are welded or otherwise assembled to create a sealed enclosure for a transmitter transducer 40 and field generator 42. The transducer 40 is a Bourdon tube apparatus including a Bourdon tube 44 shown as a semicircular structure with an oval cross section, sealed at a distal end 46, and connected to an inlet tube 48 at a proximal end 50. The inlet tube 48 is connected to a fitting 52 that provides sealed passage through a channel 54 in the base 38 to open the inside of tube 44 to the container 34 internal atmosphere 56 (liquid or gas). The distal end 46 of the tube 44 is pivotally attached to a mechanism (represented by arm 58) that extends to a pinion shaft 60. The pinion shaft 60 is pivotally mounted (not shown) and extends upward and is rigidly connected to a bar magnet 62 functioning as the field generator 42. In operation, the pressure in the sealed housing 35 is a constant at a given temperature, or a constant if a vacuum. Since the inside of the Bourdon tube 44 is open to the inside 56 of the container 34, the pressure in the tube 44 is the same as in the container 34 interior 56. If the pressure in the tube 44 is greater than in the housing 35, the pressure will cause the tube to straighten, i.e. unwind, to a degree depending on the value of pressure applied resulting in a rotation of the pin 60 and therefore also the magnet 62, thereby changing the orientation/position of the magnetic field 64 radiated from the magnet. The transmitter 32, therefore, responds to a value of the physical property (pressure) by the container 34 and transmits (radiates) a magnetic field with a characteristic (directional orientation) indicative of a value (pressure level) of the physical property (pressure). The transducer Bourdon tube 44 is an example of any of various types of transducers that can be used to transfer a value of a physical property, such as temperature or pressure, into a particular position of a mechanical element. The position of the element is used to influence a magnetic field generator, for example magnet 62, to provide a field characteristic such as field orientation to indicate the value of the physical property. For example, a themostat such as in a furnace uses a metal or metals having a particular material dimension sensitive to temperature for the purpose of controlling a switch to turn the furnace off and on. In the present invention, such material dimension sensitivity/movement can be used to adjust the position/rotation of a magnet to give indication of a value of a physical property.

The transmitter 32 is preferably positioned close to the inside of container 34 wall portion 66, and the receiver 68 is positioned close to the outside of the wall portion 66. The receiver has a magnet 70 attached to a pin 72 that is pivotally mounted to the base 74 of the receiver housing 76. The pin 72 extends upward through the top 78 and attaches to a pointer 80 for pointing to a calibrated scale 82 indicative of the pressure in the container 34. The field 64 transmitted (radiated/extended) from the magnet 62 of transmitter 32 extends to the wall 66 and passes through if the wall is non-magnetic. If the wall is magnetic, the field aligns magnetic domains in the magnetic wall, and the magnetized wall portion 66 then radiates-extends a corresponding magnetic field exterior to the container 34. The magnet 70 of the receiver, being free to rotate, then aligns itself with the field extended by the magnet 62, which is in a position dependent on the container 34 pressure. The resulting orientation of the magnet 70 is transferred via pin 72 to pointer 80 to point at the scale 82 indicating the container pressure as calibrated.

The apparatus of FIG. 2 is illustrative of a preferred embodiment of the present invention. Other transmitter and receiver constructions for responding to a container physical property transferring a magnetic indication of a value of the property through a magnetic wall and detecting the magnetic field and displaying a parameter value indication will be apparent to those skilled in the art, and these are included in the spirit of the present invention. For example, if the transducer 40 is a temperature sensitive apparatus for providing positioning of a magnet for indication of the container interior temperature, the receiver 68 would be appropriately calibrated. Also, although a permanent magnet or a set of permanent magnets in the receiver is preferred, alternate embodiments include a magnetic sensing coil to measure the position of the magnetic field produced by the transmitting magnet, and a LCD to display the value of the sensed quantity. Also, for further example, the scale 82 and pointer 80 of the receiver could be replaced with a disk attached to the pin 72. The disk could have graduations imprinted on it which could be "read" as in an optical encoder system to provide a parameter value (temperature, pressure, etc.) on an electrical (LED etc.) display. These and other variations that will be apparent to those skilled in the art are included in the spirit of the present invention.

Figure 3:
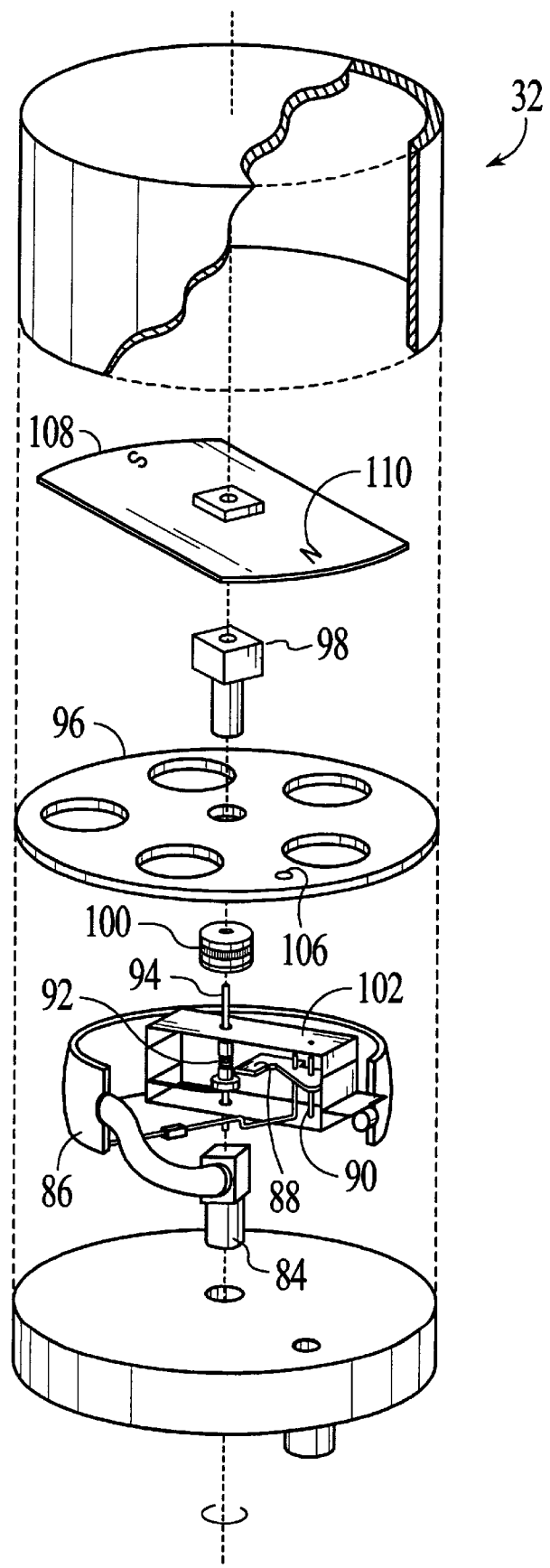
FIG. 3 illustrates further details of the apparatus of FIG. 2.
Figure 4:
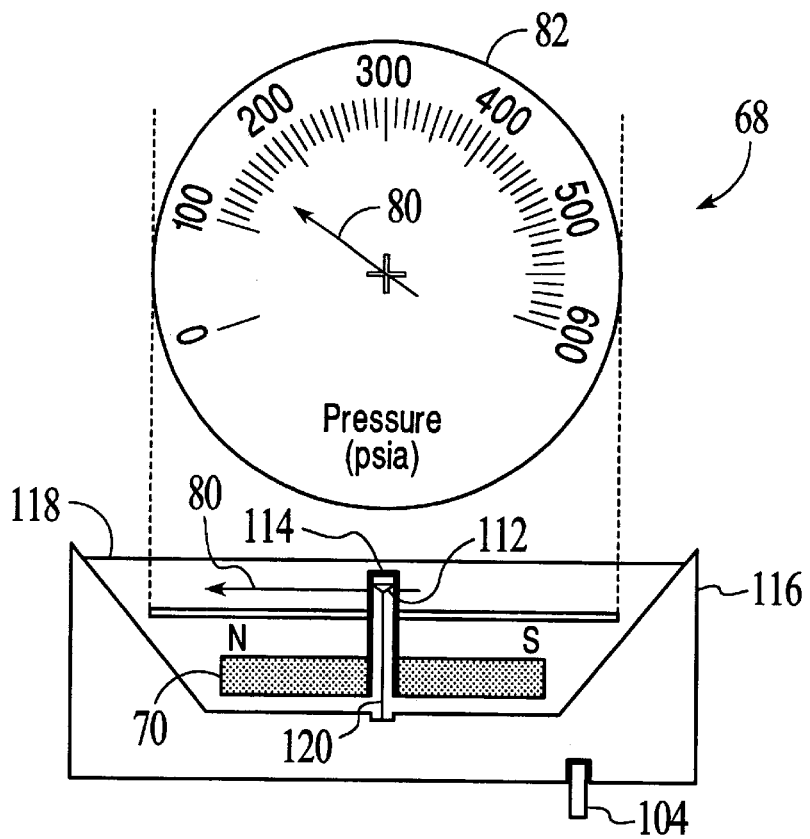
FIG. 4 is an exploded view of the parts of the transmitter.
Figure 5:
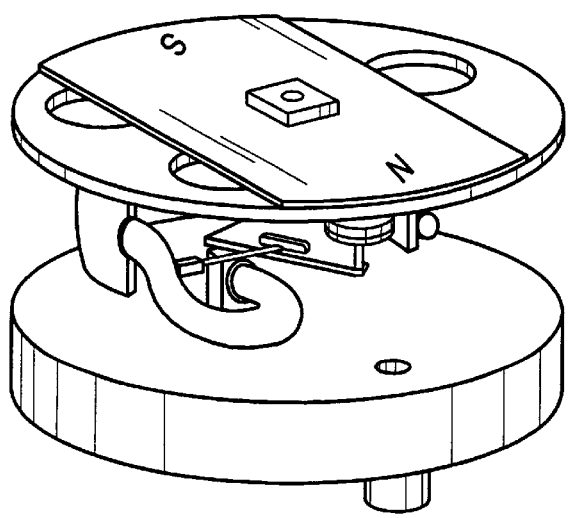
FIG. 5 shows details of the receiver/read-out apparatus.

The transmitter 32 of the preferred embodiment of the present invention for measuring pressure is also shown in FIGS. 3 and 5 and the receiver 68 is shown in FIG. 4. FIG. 3 is an exploded view of the parts of the transmitter 32. Referring to FIG. 3, pressure applied to the inlet port 84 of a Bourdon tube 86 causes the Bourdon tube to flex in proportion to the applied pressure. The base end of a sector gear 88 is pivotally attached to the Bourdon tube 86. As the Bourdon tube flexes, the sector gear 88 is caused to rotate about a pivot pin 90 that is used for that purpose as well as to calibrate the extent of the angular motion for a given pressure. Calibration is accomplished by locating the pivot point variously in a slot in the sector gear 88. As the sector gear 88 rotates, it engages with a gear 92 and causes an angular rotation of the pinion shaft 94 that is proportional to the applied pressure, with the proportionality constant being determined by the location of the pivot pin 90 in the slot. A magnet support plate 96 and a boss 98 are welded together and supported on the pinion shaft 94 by a thrust bearing 100 that rests on the sector gear support frame 102. The end of the pinion shaft 94 is welded to the boss 98. Prior to welding the boss 98 to the pinion shaft 94, the magnet plate 96 is aligned to an index pin 104 of the receiver (see FIG. 4) by means of alignment holes 106. Following alignment, a magnet 108 is installed on the magnet support plate 96 with its North pole 110 oriented over the alignment hole 96 in the support plate 96. Alternatively, the proper alignment between the transmitting apparatus and the receiver apparatus can be achieved by affixing the index pins after the magnet 108 is installed in the transmitting apparatus.

In FIG. 4, the permanent magnet 70 is shown suspended from a jeweled mount 112 using a capped tube 114 and installed in a case 116 with a glass cover 118. The needle 80 is attached to the magnet 70 by way of the tube 114 and is used to indicate the measured pressure on a dial face/scale 82. The receiver 68 incorporates the index pin 104. Alignment between the transmitter and receiver is accomplished by aligning the index pins to axially align the pin 120 of the receiver 68 with the pivot pin 94 of the transmitter 32.

The mechanical gauge of the receiver 68 could be replaced with an electronic output such as an optical encoder as discussed above.

Figure 6:
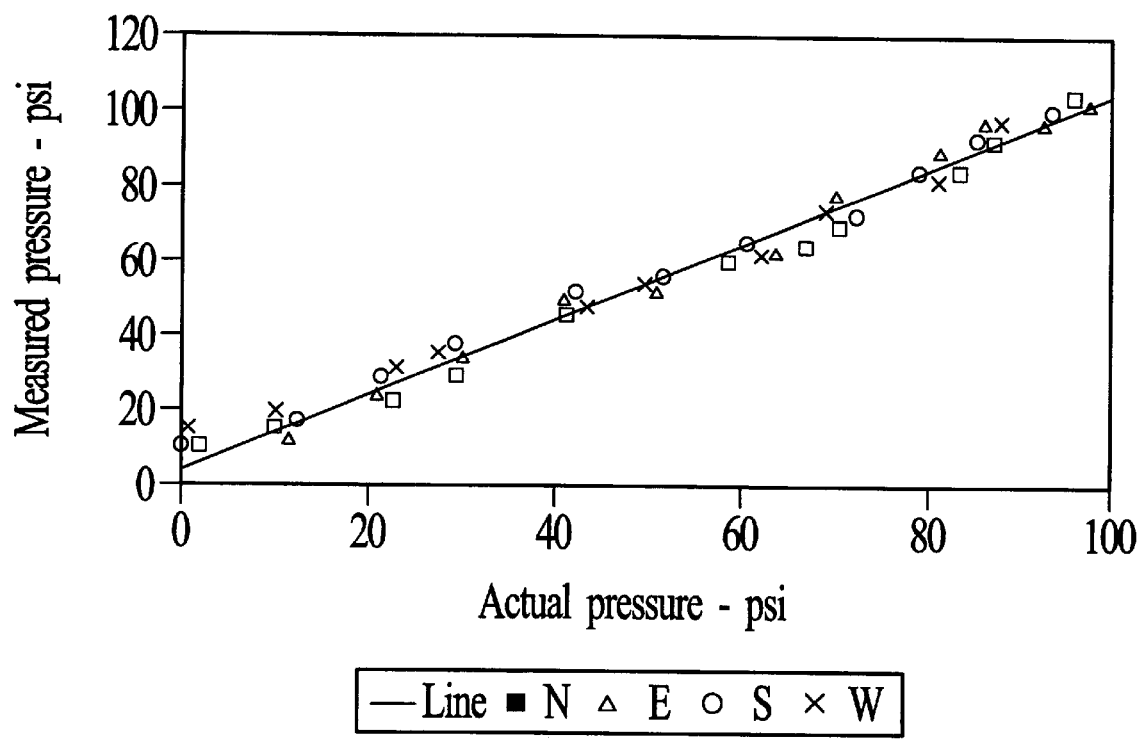
FIG. 6 shows the transmitter in assembled form.

FIG. 6 shows the data collected with a prototype of the present invention for measuring pressure over a range of 0 to 100 psi for all four orientations of the gauge/measurement apparatus with respect to magnetic North. The transmitter 32 and the receiver 68 are separated by air, and the distance between them is 2 inches. The calibration curve is highly linear, because the strength of the magnets are sized to operate efficiently over this separation distance with respect to the earth's magnetic field and the spring elasticity of the Bourdon tube. The nonlinear response between 0 and 10 psi is due to the very low spring constant of the Bourdon tube. The precision of one standard deviation of the pressure data of a regression line fit to all of the data (at all orientations of the sensor with respect to magnetic North) is ~3 psi. There is a calibration offset of about 5 psi.

Figure 7:
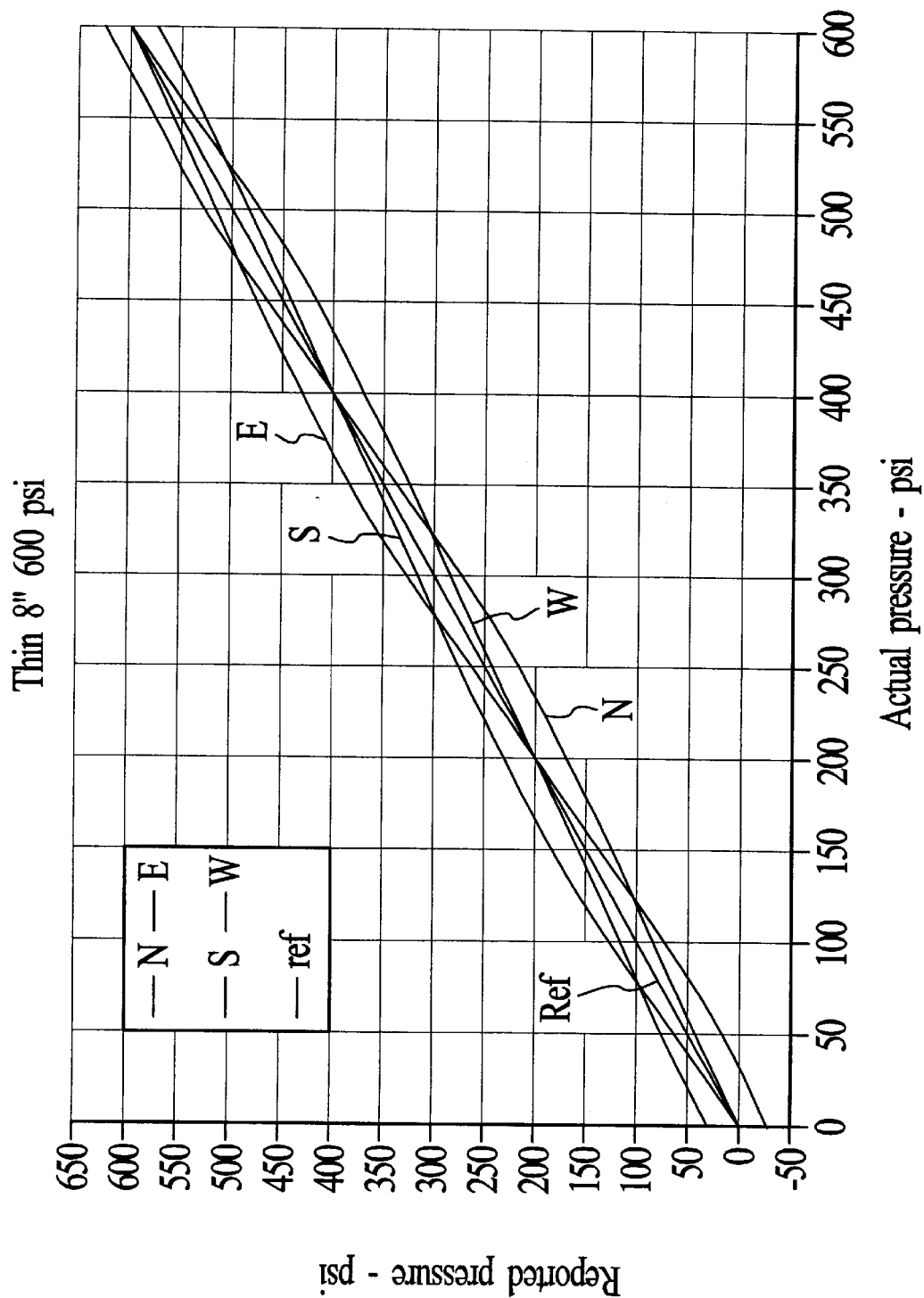
FIG. 7 is a plot of data collected with a prototype device of the present invention for measuring pressure from 0 to 100 psi for all four orientations of the measurement apparatus.

A model, which accounts for the transmitter response, and the strength and orientation of the magnets and the earth's magnetic field, was developed and used to design the pressure measurement apparatus illustrated above. The design requires that the strength of the magnet be matched to the application. FIG. 7 shows the predicted operation of a pressure measurement apparatus with magnets that results in only partial compensation of the earth's magnetic field. As shown in the figure, incomplete compensation of the earth's magnetic field results in "S-shaped" curves. Complete compensation would remove the "S-shaped" response and show a linear response. FIG. 7 includes four S shaped curves representing the four positions (N, S, E, W), and one linear line as a reference.

Figure 8:
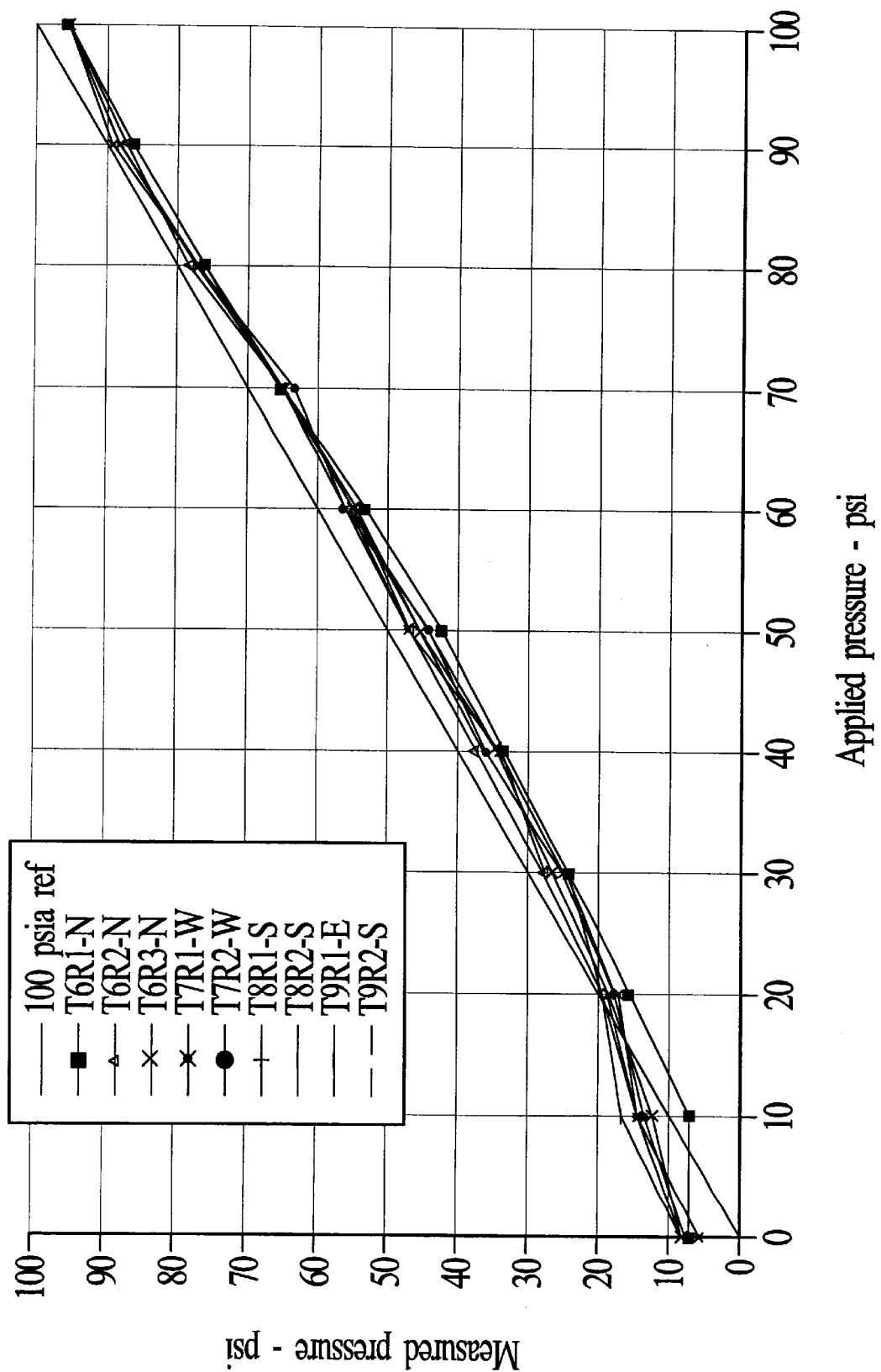
FIG. 8 is a graph showing predicted operation of a pressure measurement apparatus with improperly sized magnets.
Figure 9:
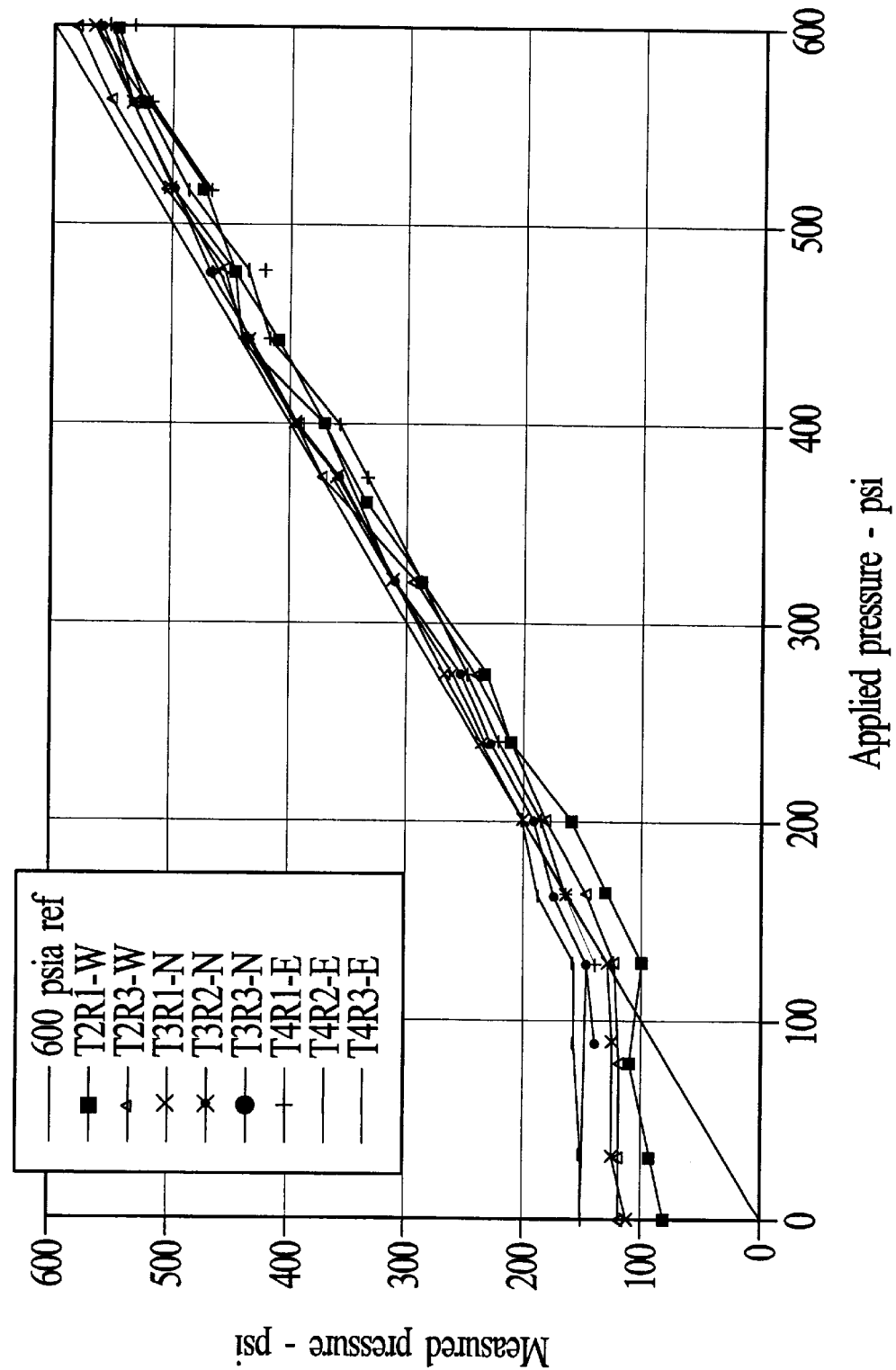
FIG. 9 shows the output of a prototype of the present invention with operations between 0 and 100 psi.

FIG. 8 shows the output of a prototype of the present invention described above for measuring pressure. Operation is between 0 and 100 psi with a 2-in. separation between the transmitter and receiver in the top portion of a specialized stainless container for storing spent nuclear fuel. Each curve is data for a particular test run, and magnet orientation, where T6 R1-N is for Test 6, Run 1 with a magnet orientation of North. FIG. 9 shows data taken with a second pressure measurement apparatus operating between 0 and 600 psi at an 8-in. separation distance. The apparatus was positioned in the top portion of the specialized container. While both units can be used to measure the pressure inside the "closed container," all they need to do in actual operation is to indicate when a specific pressure has been reached, somewhere between 50 and 90% of the operational range of each transmitter.

The data shown in FIGS. 8 and 9 were obtained by slowly increasing the pressure from one set point to the next (typically, in 40 psi increments for the 600 psi apparatus, and in 10 psi increments for the 100 psi apparatus) and reading and recording the applied and measured pressures on a data sheet. Test data were obtained for each of the principal orientations of the pressure apparatus with respect to magnetic North. Several test sequences were conducted.

The results from nine test runs are shown in FIG. 8 for the 100-psi apparatus, and eight test runs are shown in FIG. 9 for the 600-psi apparatus. Also shown in FIGS. 7 and 8 is the "ideal" curve, where the measured pressure would equal the applied pressure plus about 15 psi (since the MCO gauge is an absolute pressure sensor). It is seen that there is good test-to-test repeatability in the data. That the individual data plots do not show any significant differences with magnetic orientation (denoted in the plot legend) indicates that the transmitter magnets have been properly designed so as to compensate for the effects the earth's magnetic field would otherwise have on the measurement system. When the pressure is lowered for both units, some hysteresis is observed due to drag in the systems produced by the mass of the magnet acting upon the thrust bearing in the transmitter.

FIG. 9 shows that the behavior of the 600 psi transmitter is not responding well at low pressures. This is because the Bourdon tube has a sector gear with a pivot pin that has some excess clearance in it. With only the (usual) weight of a thin needle attached to the Bourdon tube, an anti-backlash spring in the sector gear mechanism maintains the pivot pin against one side of the sector gear. With the heavy magnet installed—needed to reach out the required 8.5 inches—the anti-backlash spring is ineffective, allowing a "dead band" to develop. There are a number of ways to reduce or eliminate this deadband. One way of reducing or eliminating the deadband is to insert a shim in the sector gear 88 to reduce the play between the sector gear 88 and the pivot pin 90.

FIG. 8 shows a plot of the average of nine tests of the 100 psi apparatus. The data shows the points collected at 10 psi intervals. The "dead band" is apparent in the 100 psi data also, but it is not as significant as the 600 psi unit. This is because—in the 100 psi transmitter—the magnet is much smaller that in the 600 psi transmitter (because it has to only reach out about 2 inches to affect the readout) and is thus much less massive. The average error in this data is about 2.5 psi or about 3% of full scale.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of determining the value of a physical property inside a sealed container, said physical property selected from the group consisting of pressure and temperature, comprising the steps of:

(a) sensing a value of said physical property with a self contained transducer positioned inside of said container, wherein said value is indicated by a movement of a magnet in a direction that maintains an orientation of the magnet at an approximately constant distance from a wall of the container, creating a magnetic field which may be sensed on the exterior of said wall;

(b) radiating a magnetic field from said magnet inside said container, the orientation of the magnet having a characteristic indicative of said value, thereby causing an external magnetic field outside of said container, said external field having a corresponding characteristic indicative of said value; and (c) responding to said external field to display an indication of said value.

2. A method as recited in claim 1 wherein said method does not require penetrating said sealed container.

3. A method as recited in claim 1 wherein said sealed container is enclosed by a wall constructed from a material that is non-magnetic.

4. A method as recited in claim 1 wherein said sealed container is enclosed by a wall constructed from a material that is weakly magnetic.

5. A method as recited in claim 3 wherein said material is stainless steel.

6. A method as recited in claim 4 wherein said material is stainless steel.

7. A method as recited in claim 1 wherein said container is for storage of radioactive material.

8. A method as recited in claim 1 wherein said sensing is performed by a Bourdon tube.

9. A method as recited in claim 1 wherein said responding includes a magnet positioned exterior to said container aligning itself with said exterior magnetic field.

10. A method as recited in claim 9 wherein said responding further includes an indicator responsive to said aligning.

11. A method as recited in claim 1 wherein said responding includes a coil or set of coils that can be used to sense the orientation of the said exterior magnetic field.

12. A method as recited in claim 11 wherein said responding further includes an indicator of the sensed magnetic field.

13. An apparatus for determining a value of a physical property inside a sealed container without penetrating a wall of said sealed container, said physical property selected from the group consisting of pressure and temperature, comprising:

a transmitter apparatus for placement inside said sealed container, and said transmitter apparatus being self contained, said transmitter apparatus including (i) a transducer apparatus responsive to a value of said physical property to provide a corresponding position of a mechanical element, said value indicated by movement in a direction that maintains an orientation of the element at an approximately constant distance from a wall of the container, creating a magnetic field which may be sensed on the exterior of said wall;

(ii) a transmitter magnet attached to said element for radiating a magnetic field with an orientation corresponding to said position of said element, and said magnetic field including an external magnetic field component external to said container;

(b) a receiver apparatus for placement outside said container, said receiver apparatus including (i) a receiver magnet apparatus including a receiver magnet, said magnet apparatus allowing said receiver magnet to align with said external field component;

(ii) a display apparatus responsive to a position of said receiver magnet to provide an indication of said value.

14. An apparatus as recited in claim 13 wherein said display apparatus is a mechanical display.

15. An apparatus as recited in claim 14 wherein said display apparatus is a needle gauge.

16. An apparatus as recited in claim 13 wherein said display apparatus is an electronic display.

17. An apparatus as recited in claim 13 wherein said transducer apparatus produces a rotational movement in response to changes in the physical property being sensed.

18. An apparatus as recited in claim 13 wherein said transducer produces a translational movement in response to changes in the physical property being sensed.

19. An apparatus as recited in claim 17 wherein said receiver apparatus senses the external magnetic field of the rotational movement produced by the transmitting apparatus.

20. An apparatus as recited in claim 18 wherein said receiver apparatus senses the external magnetic field of the translational movement produced by the transmitting apparatus.

21. An apparatus as recited in claim 13 wherein said transducer apparatus includes a Bourdon tube.

22. An apparatus as recited in claim 13 wherein said transducer apparatus includes an element that expands and contracts in response to temperature change and produces a rotational movement that can be tracked with a magnet.

23. An apparatus as recited in claim 13 wherein said transducer apparatus includes an element that expands and contracts in response to temperature change and produces a translational movement that can be tracked with a magnet.

24. An apparatus as recited in claim 13 wherein said receiver apparatus is a coil that senses the external magnetic field component.

25. An apparatus as recited in claim 24 wherein said receiver apparatus includes a display of the sensed external magnetic field.

26. The method of claim 1 wherein said transducer produces a rotational movement in response to changes in the physical property being sensed.

27. The method of claim 1 wherein said transducer produces a translational movement in response to changes in the physical property being sensed.

* * * * *